US011589084B2

(12) United States Patent
Gasquet et al.

(10) Patent No.: US 11,589,084 B2
(45) Date of Patent: Feb. 21, 2023

(54) DYNAMIC, INTERACTIVE SEGMENTATION IN LAYERED MULTIMEDIA CONTENT

(71) Applicant: Bauhaus X LLC, Los Angeles, CA (US)

(72) Inventors: Arno Gasquet, Los Angeles, CA (US); Artem Timofeev, Los Angeles, CA (US); Vladimir Kvashin, Los Angeles, CA (US)

(*) Notice: Subject to any disclaimer, the term of this patent is extended or adjusted under 35 U.S.C. 154(b) by 0 days.

(21) Appl. No.: 17/319,924

(22) Filed: May 13, 2021

(65) Prior Publication Data

US 2021/0360298 A1    Nov. 18, 2021

Related U.S. Application Data

(60) Provisional application No. 63/035,465, filed on Jun. 5, 2020, provisional application No. 63/024,475, filed on May 13, 2020.

(51) Int. Cl.
| | |
|---|---|
| *H04N 5/445* | (2011.01) |
| *H04N 21/234* | (2011.01) |
| *H04N 21/478* | (2011.01) |
| *H04N 21/658* | (2011.01) |
| *H04N 21/4725* | (2011.01) |

(52) U.S. Cl.
CPC .  *H04N 21/23412* (2013.01); *H04N 21/23418* (2013.01); *H04N 21/4725* (2013.01); *H04N 21/47815* (2013.01); *H04N 21/658* (2013.01)

(58) Field of Classification Search
CPC .......... H04N 21/4782; H04N 21/2187; H04N 21/812; H04N 21/8586

USPC ....................... 725/60, 34, 36, 110
See application file for complete search history.

(56) References Cited

U.S. PATENT DOCUMENTS

| | | | |
|---|---|---|---|
| 2009/0083815 A1* | 3/2009 | McMaster | H04N 21/8586 725/110 |
| 2011/0137753 A1* | 6/2011 | Moehrle | G06V 20/41 705/27.1 |
| 2012/0167146 A1* | 6/2012 | Incorvia | H04N 21/4725 725/60 |
| 2016/0203648 A1 | 7/2016 | Bilbrey et al. | |
| 2018/0091859 A1 | 3/2018 | Woehrle | |
| 2018/0190032 A1 | 7/2018 | Barnett et al. | |
| 2020/0014980 A1 | 1/2020 | Andrews et al. | |
| 2020/0133987 A1 | 4/2020 | Cordasco | |

OTHER PUBLICATIONS

Korean Patent Office, International Search Report and Written Opinion, dated Aug. 27, 2021.

* cited by examiner

*Primary Examiner* — Jivka A Rabovianski

(57) ABSTRACT

Computer implemented systems and methods are described for providing layered multimedia content. Specifically, the systems and methods can analyze a content stream or file using software to identify objects present in the first content, which could include people, items, places, music, sounds, and so forth. One or more elements can be generated and overlaid on to the content, which allow a viewer of the content to access information about the object and/or purchase a product or service associated with the object. Such information can be presented to the viewer when the viewer clicks on or otherwise interacts with the element.

21 Claims, 11 Drawing Sheets

```xml
<?xml version="1.0" encoding="UTF-8"?>
<video>
        <id></id>
        <title><title> <!-- заголовок видео -->
        <type></type> <!-- тип видео -->
        <category></category> <!-- категория видео -->
        <published></published> <!-- тип видео -->
        <publisher></publisher> <!-- автор видео -->
        <description></description> <!-- описание видео -->
        <tags></tags> <!-- теги -->
        <size>
        </size>
        <statistics>
                <views></views> <!-- число просмотров -->
                <likes></likes>
                <dislikes></dislikes>
                <shares></shares>
```

FIG. 7A

```xml
</statistics>
            <object> <!-- один объект (товар, продукт) -->
                <id></id>  <!-- индивидуальный номер объекта -->
                <version></version> <!-- версия описания -->
                <publisher></publisher> <!-- создатель описания -->
                <type></type> <!-- тип объекта = product (url / img) -->
                <pause>0</pause> <!-- пауза видео при клике на объект. 0 - без паузы -->
                <data>
                        <title></title> <!-- название -->
                        <description></description> <!-- описание -->
                        <brand></brand> <!-- бренд -->
                        <price></price> <!-- цена -->
                        <url></url> <!-- ссылка -->
                </data>
                <images>
                        <image></image> <!-- картинки -->
                        <image></image>
                </images>
                <frames> <!-- активные области. накладываемые на видео -->
                        <frame> <!-- первая активная область, их может быть несколько -->
                                <id></id> <!-- ID активной области -->
                                <timein></timein>
                                <timeout></timeout>
                                <color></color> <!-- цвет блока -->
                                <bordercolor></bordercolor> <!-- цвет рамки блока -->
                                <z-index>1<z-index> <!-- расположение объекта по глубине, относительно других -->
                                <form> <!-- форма блока -->
                                        <svg></svg> <!-- SVG с блоком -->
                                </form>
```

FIG. 7B

```
<motion> <!-- описание движения блока из точки А в точку Б, следующий такой же блок
описывает движение из Б в С и так далее -->
                                            <duration></duration> <!--
продолжительность движения -->
                                            <motion-type></motion-
type> <!-- тип движения, пока линейный linear-->
                                            <motion-path></motion-
path> <!-- путь или функция по которой движется область -->
                                            <xstart></xstart> <!--
начало -->
                                            <ystart></ystart>
                                            <width-start></width-
start> <!-- размер в начале в процентах (?)  -->
                                            <heigh-start></heigh-start>
                                            <x-finish></x-finish> <!--
конец -->
                                            <y-finish></y-finish>
                                            <width-finish></width-
finish> <!-- размер в конце в процентах (?)  -->
                                            <heigh-finish></heigh-
finish>
                                        </motion>
                                </frame>
                        </frames>
                        <statistics> <!-- статистика по объеекту -->
                                <published></published> <!-- дата первой публикации
-->
                                <edited></edited> <!-- дата последней редакции -->
                                <last_access></last_access> <!-- последний доступ -->
                                <views></views> <!-- число просмотров -->
                                <clics></clics> <!-- кликов -->
                                <sales></sales> <!-- продаж -->
                        </statistics>
                </object>
</video>
```

FIG. 7C

DYNAMIC, INTERACTIVE SEGMENTATION IN LAYERED MULTIMEDIA CONTENT

This application claims priority to U.S. provisional application having Ser. No. 63/024,475 filed on May 13, 2020 as well as U.S. provisional application having Ser. No. 63/035,465 filed on Jun. 5, 2020. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is interactive multimedia content, and more specifically to a dynamic, interactive segmentation in layered multimedia content.

BACKGROUND

The following description includes information that may be useful in understanding the present invention. It is not an admission that any of the information provided herein is prior art or relevant to the presently claimed invention, or that any publication specifically or implicitly referenced is prior art.

Constant development of modern multimedia technologies demands increased interaction between the content and viewers. Video content is by far the most popular content currently, including for example, movies, television shows, sports games, video blogs, social media videos and stories, and so forth. However, the interface for viewing the video and other content is far from being interactive and consumers/viewers have very little to no options to interact with the content they are watching.

For example, viewers are generally unable to interact with content seen in a video. If a viewer would like to obtain additional information about an object in the video, the viewer has to visually identify it and then utilize a search engine or other means to obtain the information. The same applies to an object in a video that a viewer would like to buy. Typically, the viewer first needs to identify that object and then go online and search for it in an online store.

Except for situations where a video is specifically designed to sell an object and contains a link to purchase the object, such as a commercial advertisement, it is generally tedious for viewers to visually identify the exact characteristics of an object or even identify the object itself, a place, a music, a sound or anything else in a video content, especially where the content is not specifically about the desired object.

Some services use a format of outside text description of an object in video content. For example, bloggers using the Instagram platform can only attach links (URLs) to their bio. In YouTube videos, links (URLs) to specific goods, services or information can be placed in the description of the video. Or while watching a movie or a TV show on Amazon, viewers can only see actors shown at the current scene if they pause it. All these solutions fall far short of interactive interaction between the content and viewer, as they only provide specific information presented by the publisher rather than allow a wide variety of objects in video to be explored/purchased by viewers.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for systems and methods for providing interactive segmentation in layered multimedia content that can be dynamically created for one or more objects in video content.

SUMMARY OF THE INVENTION

The inventive subject matter provides apparatus, systems and methods for providing interactive segmentation in layered multimedia content that can be dynamically created for one or more objects in video or other content. As used herein, the terms "video content" or "video files" include video files transmitted between computer devices of users as well as streaming videos provided by media companies including, for example, YOUTUBE®, NETFLIX®, APPLE TV®, DISNEY+®, VIMEO®, AMAZON® VIDEO, FACEBOOK®, TIK TOK®, and so forth.

In general, the inventive subject matter discussed herein may include software that incorporates, augments, or appends one or more layers of interactive areas having one or more elements on to an existing content (live or previously created). Advantageously, the software can be used to analyze the content to identify one or more objects in the content, generate one or more interactive areas, and append/augment/incorporate the one or more layers including the interactive layers on to the content. The content can be analyzed via existing image recognition techniques to identify objects in the content. The objects and/or information derived from the objects (such as various characteristics) can then be compared with a database of information to identify one or more of the objects in the content. If an object is identified with a certainty that is above a predefined threshold, the server can create an element to be overlaid on top of the object in the content.

In this manner, the software can provide an overlay to the content that enables users/viewers of the content to access additional information concerning the one or more objects in the content.

As used herein, the term "element" refers to the software technology used to create computer-generated overlays for existing or live content. As one example, one or more layers or overlays having one or more elements can be presented on a graphical user interface on a computing device, such as a smart TV, a laptop, a smart phone or other devices as discussed herein. The one or more layers or overlays are computer-generated and preferably correspond to one or more objects in the content.

Contemplated objects include, for example, a person, a clothing item, a vehicle, a building or location, a sound, a picture, a food item, and so forth.

The additional information may include, for example, a hyperlink or URL to a website or social media page or application or otherwise for more information about the object, a purchase page or link to purchase the object or something related to the object, promotional material, description, picture, and so forth. Such information could be gathered from publicly available information such as websites or social media platforms or be added manually by a user.

It is further contemplated that the software may include one or more algorithms which may comprise various mathematical models and functions, image-processing algorithms, programming methods, interfaces, server software and databases, which collectively materialize the inventive subject matter.

Furthermore, the inventive subject matter discussed herein may be implemented as one or more systems and methods using standard programming and/or engineering techniques to produce software, firmware, hardware, or any combination thereof to control a computing device to implement the disclosed aspects.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIGS. 7A-7C illustrates an exemplary XML file format.

DETAILED DESCRIPTION

Figure 1:
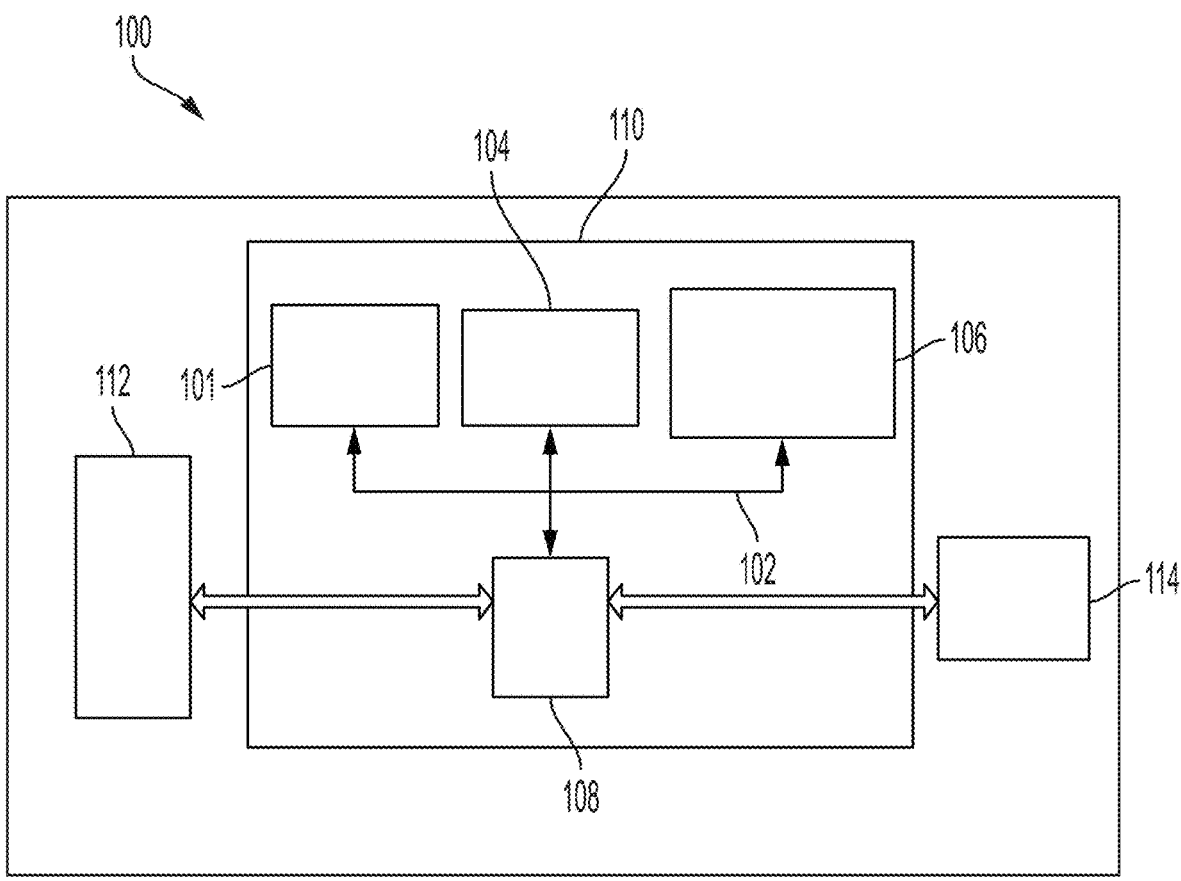
FIG. 1 illustrates a diagram of one embodiment of a system of the inventive subject matter.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Embodiments of the inventions described herein may include or utilize a special purpose or general-purpose computer that includes one or more servers and/or other computer hardware. The one or more servers can each include, for example, one or more processors and system memory. The computer can also include physical and other computer-readable media for carrying or storing computer-executable instructions and/or data structures. Such instructions can facilitate the systems and methods described and may be stored in a non-transitory computer-readable medium and executable by the one or more servers or other computing devices. As an example, a processor may receive instructions from a non-transitory computer-readable medium and execute those instructions to perform one or more processes.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Non-transitory computer-readable media can be any available media that can be accessed by a general purpose or special purpose computer system. Examples of computer-readable media include magnetic storage devices (e.g., hard disk, floppy disk, magnetic strips . . . ), optical disks (e.g., compact disk (CD), digital versatile disk (DVD), Blu-ray™ . . . ), smart cards, solid-state devices (SSDs), and flash memory devices (e.g., card, stick), or any other medium which can be used to store desired application code in the form of computer-executable instructions or data structures and which can be accessed by a general purpose or special purpose computer.

Computer-executable instructions include, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

The systems and methods described herein may utilize various communication protocols including, for example, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As shown in FIG. 1, one contemplated system 100 or platform for providing layered multimedia content is shown in which various embodiments and process steps disclosed herein can be implemented. The system preferably comprises one or more servers 110 that include at least one processor 104. The server 110 may be local to a computing device or remote, for example in a cloud architecture. Server 110 may include micro processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described herein. That is, the processor 104 and other components may be used to implement any one or more of the various embodiments, systems, algorithms, and processes described herein.

As used herein, the term "computing device" (which may also be referred to as a "user device") is defined to include televisions, content devices for televisions including APPLE TV and FIRE TV, desktop computers, laptop computers, tablet PCs, smart phones including, for example, those running APPLE iOS™ or ANDROID™ operating software, smart watches, smart glasses such as GOOGLE glass or their equivalent capable of displaying the one or more elements to a user wearing the glasses, and all other devices that can connect to a network and receive and/or transmit information from or to a server.

The processing system of server 110 may be implemented with a bus architecture, generally represented by bus 102. The bus 102 may include any number of interconnecting buses and bridges depending on the specific application of the server 110 and the overall design constraints. The bus 102 may link various circuits including one or more processing circuits (represented generally by the processor 104), storage device 101, and a machine-readable, processor-readable, processing circuit-readable or computer-readable media (represented generally by a non-transitory machine-readable medium 106). Thus, processor 104 and the non-transitory medium or memory are communicatively coupled by the bus 102. The bus 102 may also link various other circuits such as timing sources, peripherals, voltage regulators, and power management circuits, which are well known in the art, and therefore, will not be described any further.

A bus interface 108 may provide an interface between bus 102 and a transceiver 114. The transceiver 114 may provide a means for communicating with various other apparatus over a transmission medium such as a wired or wireless network. Depending upon the nature of the apparatus, a user interface 112 (e.g., keypad, display, speaker, microphone, touchscreen, motion sensor) may also be provided.

The processor 104 may be responsible for managing the bus 102 and for general processing, including the execution of software stored on the machine-readable medium 106. The software, when executed by processor 104, causes server 110 to perform the various functions described herein. Machine-readable medium 106 may also be used for storing data that is manipulated by processor 104 when executing software such as a first program.

Software shall be construed broadly herein to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processor may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, and so forth.

In some embodiments, computer-executable instructions or data structures can be stored within non-transitory machine-readable medium 106.

In preferred embodiments, server 110 is configured to analyze a first content using the first program to identify a first object present in the first content. It is contemplated that the first content could be stored on the server 110 or accessed from a remote server or other storage device. In some embodiments, the first content may be streamed from a remote source either live or on-demand and/or stored on a second server. Where the content is streamed, it is contemplated that the server 110 can generate the elements and overlay them on the content dynamically and automatically as the content is streamed. This is helpful for live content where the objects cannot previously be mapped by the server 110.

Figure 3:
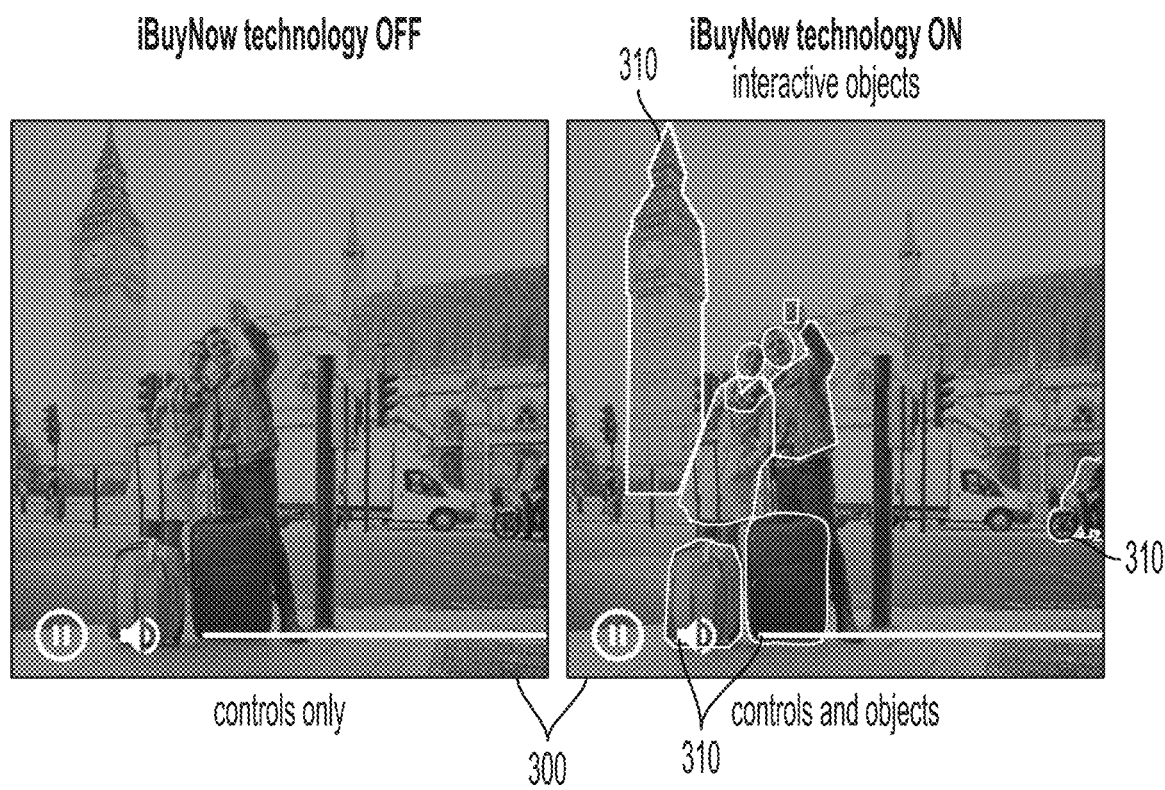
FIG. 3 illustrates how objects in a video may be dynamically defined.

After or while analyzing the first content, server 110 is further configured to automatically generate one or more elements including a first element using a first algorithm/software/API, wherein each of the one or more elements corresponds to one or more objects within the first content. Here, the first element corresponds to the first object. FIG. 3 illustrates an example of the system 100 analyzing a first content and identifying one or more objects in the first content (people, places, and things, for example).

In some contemplated embodiments, server 110 can be further configured to analyze the first content to generate content attributes (e.g., attributes of objects within the first content) and compare the content attributes with stored attributes in non-transitory machine-readable medium (memory) 106 or that may be stored on a remote server. Using this comparison and general image-analysis tools known in the art, the server 110 can automatically generate and place the one or more elements if a confidence level that an object is correctly identified exceeds a predefined threshold.

Figure 4:
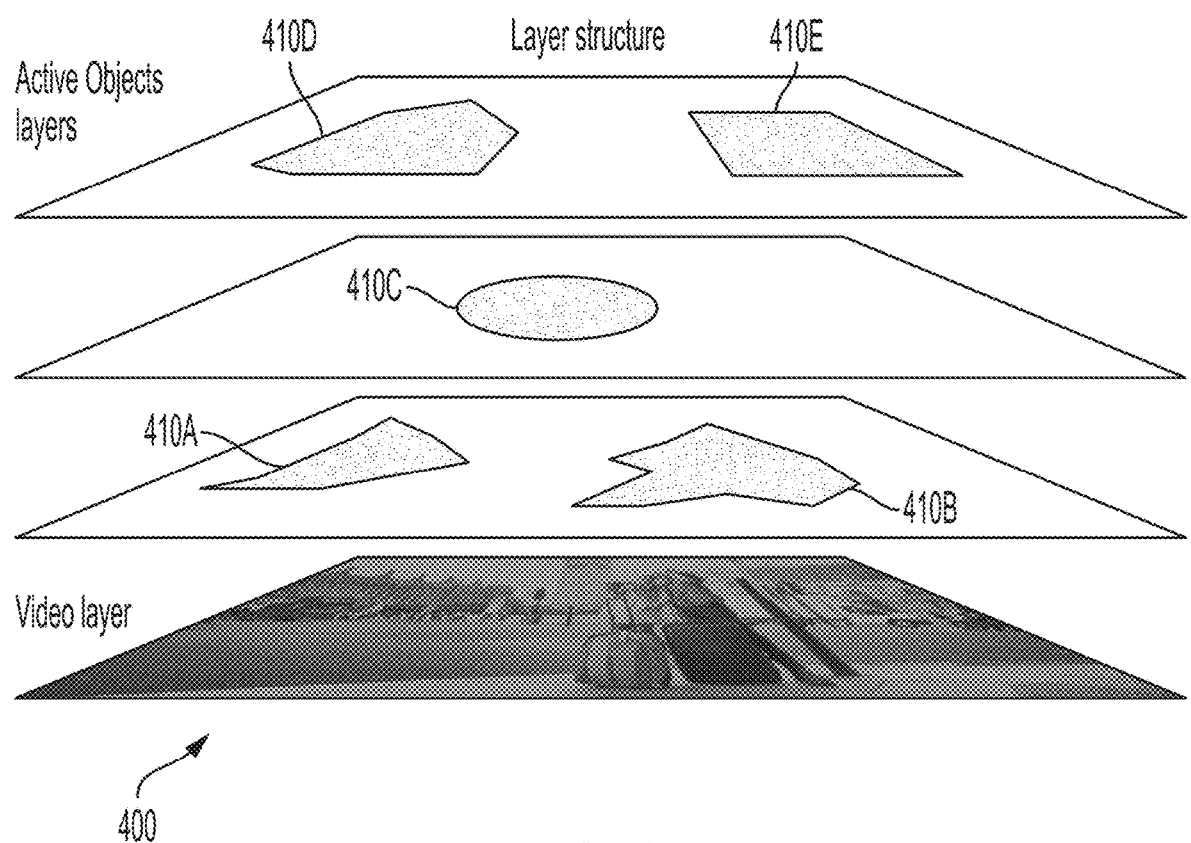
FIG. 4 illustrates an exemplary video layer architecture with active areas/elements.

After generating the one or more elements, the server 110 preferably overlays or appends each of the elements such that the one or more elements will be in front of the first content on one or more layers during a playback of the first content. One example of this is illustrated in FIG. 4 where the various elements can be disposed on multiple layers on top of or in front of the first content (video layer).

It is especially preferred that each of the elements including the first element comprises or is associated with element information, which could include, for example, a description, images, online shopping or other platform, and/or URLs or other links to webpages, applications, social media accounts and so forth.

When a viewer of the content interacts with the first elements or another element, the server 110 preferably presents the element information of that element to the viewer. This could be presented in a pop-up over a portion of the first content, a window overlaid on the first content, by opening a web browser, or by causing a connected device to access the element information, for example.

Interaction with the content may include the user clicking on an element, hovering over an element for a predetermined time, accessing the element via a voice command, and/or looking at the element for a predetermined time.

Figure 5:
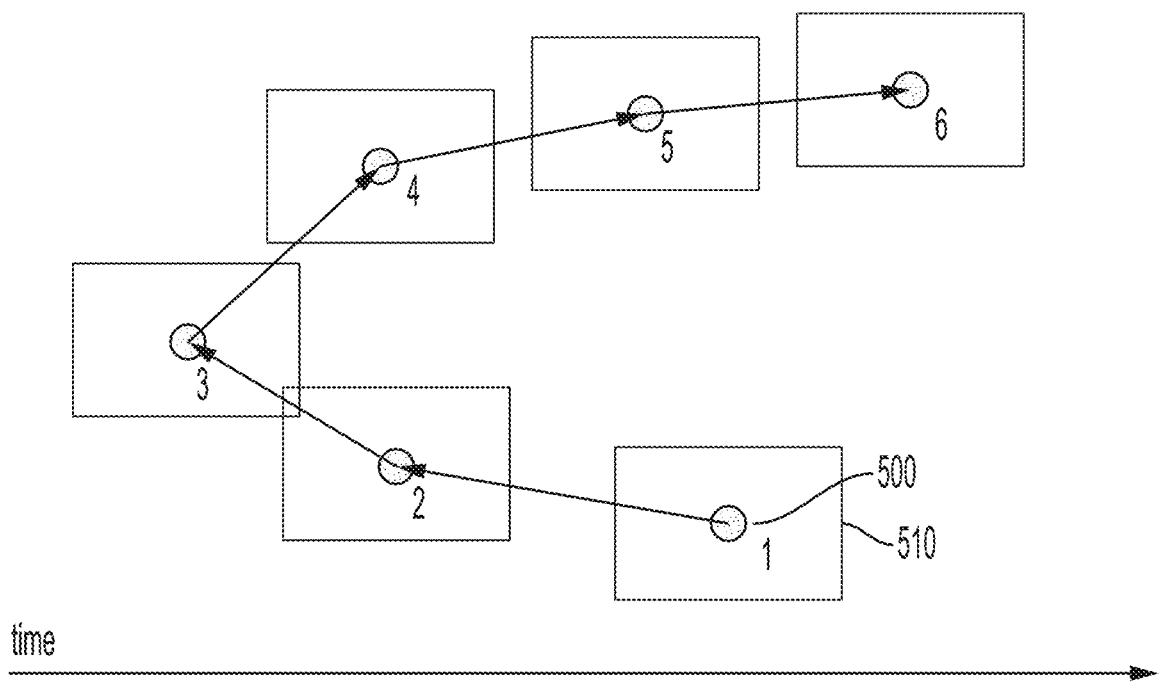
FIG. 5 illustrates an example of tracking movement of an object in a content by tracking its center point.
Figure 6:
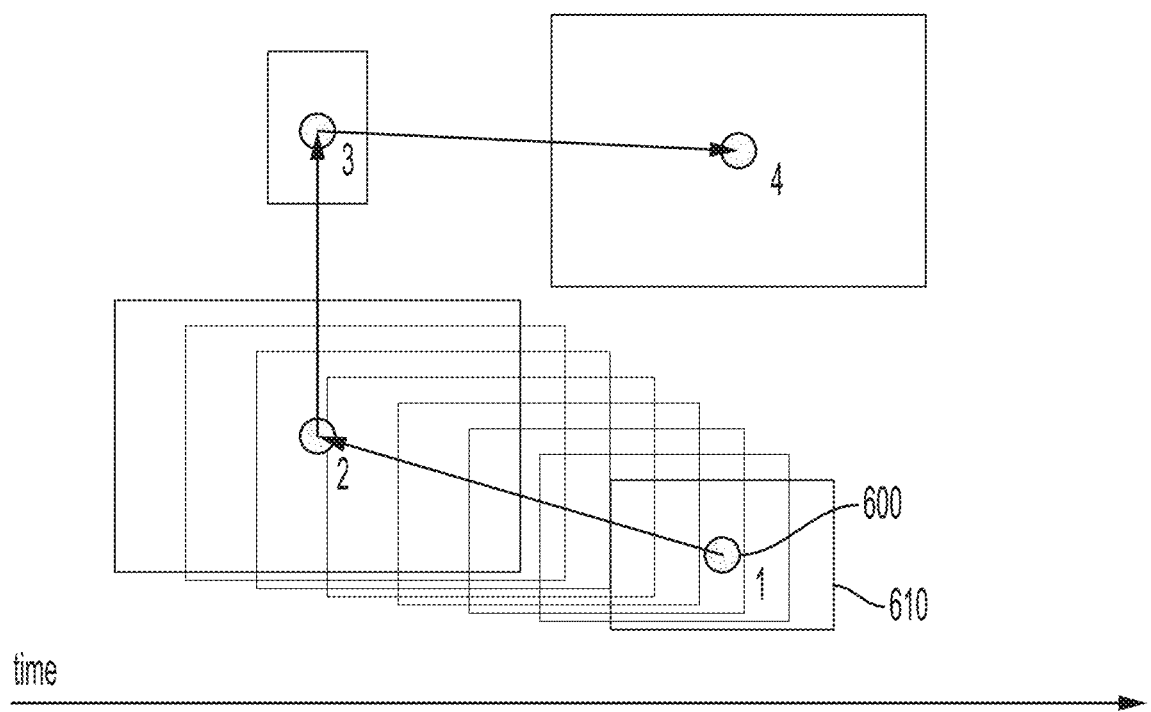
FIG. 6 illustrates an example of moving of the objects.

As shown in FIGS. 5-6, the system 100 can be further configured to analyze a movement of the first object during the playback of the first content to identify a coordinate of a center of the first object at each keyframe of the first content. The coordinates and keyframes can be stored in XML or a table, for example. The server 110 can then automatically update a position of the first element based on the stored coordinates and keyframes during playback of the first content such that the position of the first element corresponds to the movement of the first object in the first content.

In some contemplated embodiments, a computing device of a viewer comprises the server 110, which may include a software application loaded on the viewer's computing device or accessed via a browser that access a web-based application, for example. In such embodiments, the computing device preferably comprises user interface 112 which can be used to display the first content and the one or more elements. As discussed above, it is contemplated that the one or more elements could be presented on a second device such as smart glasses that can monitor what the viewer is watching (e.g., the first content).

In other embodiment, the server 110 can be remote from the computing device of a viewer and accessed via a wired or wireless network, for example.

Figure 2:
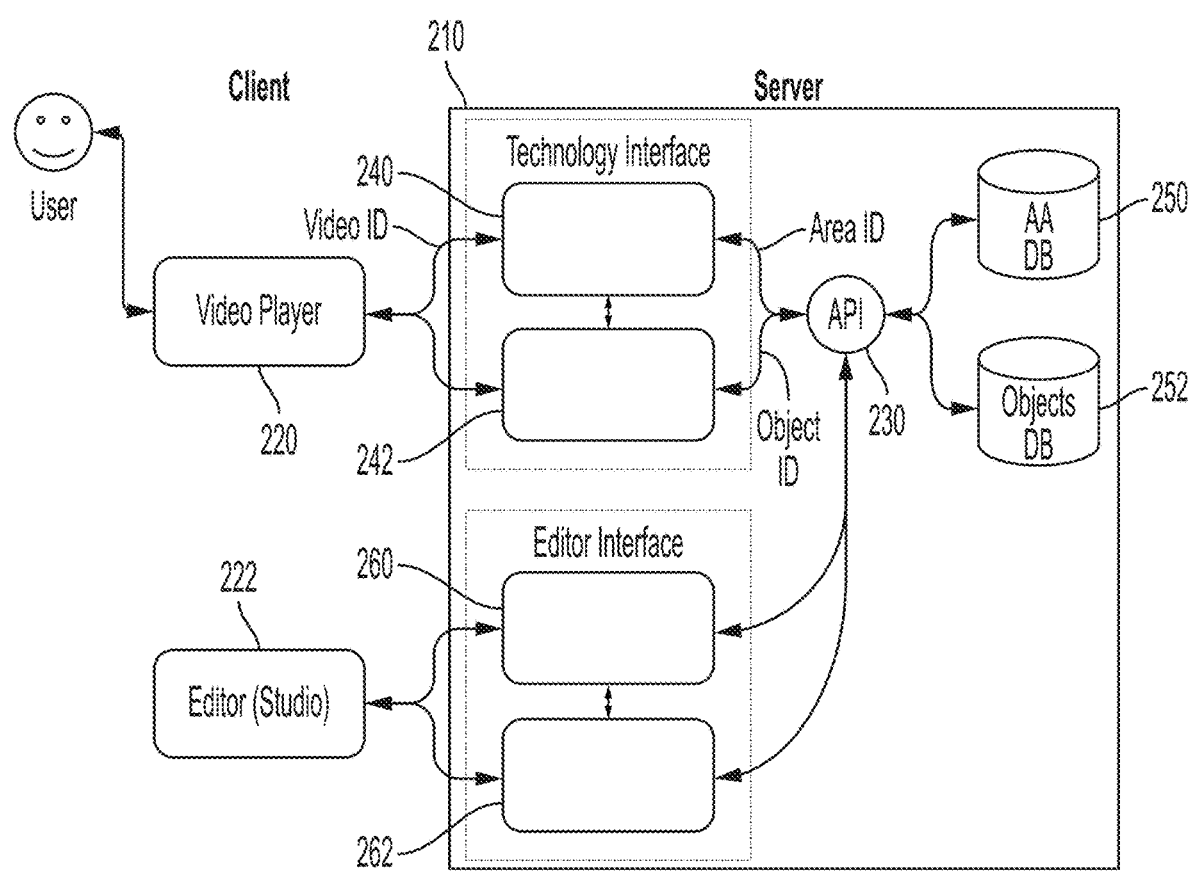
FIG. 2 illustrates a diagram of another embodiment of a system of the inventive subject matter.

FIG. 2 illustrates another embodiment of a system 200 comprising a server 210. As discussed above, server 210 preferably enables a platform for providing layered multimedia content is shown in which various embodiments and process steps disclosed herein can be implemented.

Server 210 preferably comprises at least one processor communicatively coupled to a memory such as via a bus or other architecture. The memory comprises machine-readable, processor-readable, processing circuit-readable or computer-readable media (generally, non-transitory machine-readable medium). The server 210 may be local to a computing device or remote, for example in a cloud architecture. Server 210 may include micro processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described herein. That is, the server 210 may be used to implement any one or more of the various embodiments, systems, algorithms, and processes described herein.

A video player on a user or client device 220 can connect to the server 210 to access a technology interface generated using a processor and API 230 which provides the layered multimedia content such as described herein. It is contemplated that the device 220 could access the server 210 over a wired or wireless connection. In other embodiments, it is contemplated that the server 210 could be disposed within the client device 220, such as via a software application or API 230 installed on the client device 220.

In some embodiments, server 210 is configured to analyze a first content using the API 230 playing or stored on client device 220 or a remote server/device. In some embodiments, the first content may be streamed from a remote source either live or on-demand. The first content preferably comprises a Video ID. When analyzing the content, the server 210 identifies one or more objects or active areas 240 in the content and generates one or more elements 242 to be overlaid/layered on top of the first content in the video player of device 220.

Each of the active areas 240 preferably comprises an Area ID that uniquely identifies the active area or object. Each Area ID can be associated with a size, shape, and location, or a set of sizes, shapes, and/or locations, some or all that may change over time during playback of the content. In such cases, it is contemplated that the size, shape and/or location of the active area(s) 240 can be identified at specific keyframes and that information stored in a database 250.

After or while analyzing the first content, server 210 is further configured to automatically generate one or more elements 242, which each corresponds to an active area or object 240 within the first content. The created elements 242 preferably each have a unique Object ID and can be stored in a database 252. Each Object ID can be associated with a size, shape, and location, or a set of sizes, shapes, and/or locations, some or all that may change over time during playback of the content. In such cases, it is contemplated that the size, shape and/or location of the one or more elements 242 can be identified at specific keyframes and that information stored in database 252.

Using API 230, server 210 can be further configured to associate each of the one or more elements 242 with element information, which could include, for example, a description, images, online shopping or other platform, and/or URLs or other links to webpages, applications, social media accounts and so forth.

After generating the one or more elements, the server 210 and API 230 preferably overlays or appends each of the one or more elements 242 on the content in the video player of device 220, or causes this to occur, such that the one or more elements 242 will be in front of the content on one or more layers during a playback of the content.

When the user interacts with an element 242, the server 210 preferably presents the element information of that element to the user. This could be presented in a pop-up or overlay in the video player, by opening a web browser on the device 220, for example.

It is further contemplated that the server 210 can permit another user to edit elements 242 generated by the server 210 or create one or more elements using an editor (studio) on a device 222. Using the editor and an editor interface that can be accessed from the editor or installed on the device 222, the user can edit active areas or identify objects within a content using the API 230 and active areas editor 260. In this manner, the user can mark objects or active areas within the content using a web or other interface. It is contemplated that once marked by a user, the server 210 can create an element to be overlaid on the object and can also track a movement and size/shape of the marked object during playback and vary the element accordingly using API 230.

Objects can be marked using a file markup software, which can assist in the automation of markups and identification of objects. Using artificial intelligence and the API 230, objects in the content can be marked and/or identified. This could include people in the content, clothing they are wearing, objects in the background, locations, music, voices, and so forth. The API 230 can select objects and compare their attributes with a database of known objects to identify the objects.

The user can also edit the elements generated by the server 210 using an elements editor 262. Using the editor and an editor interface that can be accessed from the editor or installed on the device 222, the user can edit elements or element information stored in database 252.

It is contemplated that the artificial intelligence and the API 230 can show actors, locations, placing products and advertisements, provide history of a character, allow a user to order a product or service. In some embodiments, the platform may allow a user to visualize the object such that the user could take a picture of the user net to the object to see what the object looks like before the user purchases it. This could be to visualize clothing or other apparel or accessories or other items.

In still other embodiments, the artificial intelligence and the API 230 may recognize the tone of a user's voice and/or a location of the user, and could be used to determine and display weather at the user's location, information about the users, and so forth to determine content to play for a user and/or advertising or objects to highlight.

FIG. 3 illustrates how objects 310 can be identified in a keyframe 300 of a video or other content using the systems and methods described herein.

FIG. 4 illustrates how elements 410A-410E can be layered on top of the content 400 using the systems and methods described herein. As shown, elements 410A, 410B can be disposed on a first layer, element 410C can be disposed on a second layer, and elements 410D, 410E can be disposed on a third layer. All the layers can be disposed in front of the content, such as to permit interaction with the elements 410A-410E as the content is viewed by a user. The use of layers can assist in tracking and editing of the elements and can be used, for example, to prioritize one element over another. Thus, for example, if element 410D and element 410A overlap, it is contemplated that element 410D would be selected if the user clicks or otherwise interacts with the area containing both elements 410A, 410D. This is because element 410D resides above element 410A and itself overlays element 410A.

While three layers of elements are shown, it is contemplated that the elements could be disposed on a fewer or greater number of layers or be disposed on a single layer.

FIG. 5 illustrates how an object can be tracked over time, such as by tracking a center point 500 of the object as the object moves during playback of the content as shown over time. The center point 500 of the object is the main marking point to position all the objects and elements. As discussed above, video content can be described as a sequence of shots and keyframes. Thus, every change of position or size of an object/active area occurs between keyframes. Objects/active areas in the content can have any shape including, for example, a rectangle, an ellipse, a polygon, a point, an area with sides—Bezier curves, an all-Frame that occupies the entire width and height of a visible area, a scalable vector graphic (SVG) shape, and/or combinations thereof.

As seen, the center point 500 of the object moves from point 1 to point 6 over time in the content. Similarly, element 510 associated with the object can also move from point 1 to point 6 over time. Here, the element 510 is shown moving in a linear (straight) movement from point 1 to point 6 at a constant speed, to ensure that the position of the element 510 is consistent. It is contemplated that non-linear movements could alternatively be used for element 510 to track the object. With this information, the systems and methods described herein can move the element 510 associated with the object over time to track the object.

Although element 510 is shown as a rectangle, it is contemplated that any polygon or other shape or combination of shapes can be used for element 510 such as those described above.

In addition to tracking a center point of the object, it is contemplated that a size and/or shape of the object can also be tracked over time as shown in FIG. 6. Like in FIG. 5, a center point 600 of an object can be tracked as the object moves during playback of the content as shown over time. As seen, the center point 600 of the object moves from point 1 to point 4 over time in the content. With this information, the systems and methods described herein can move the element 610 associated with the object 600 over time to track the object 600.

Although element 510 is shown as a rectangle, it is contemplated that any polygon or other shape or combination of shapes can be used for element 510 such as those described above.

As shown in FIG. 6, a size/dimensions of the object 600 can also be tracked and the element 610 can change in size/dimensions to match the changes to the object 600. Changes in the size/dimensions of object 600, as well as movement, occur between the keyframes. Common keyframes can be used for movement and changes in size/dimensions. It is contemplated that the following characteristics of object 600 may change together and separately between keyframes: (i) the relative coordinates X and Y of the center point of the object 600; (ii) the width of the object 600; and (iii) the height of the object 600. These attributes would also have to change for the element 610 to thereby track the object 600.

Thus, for example, the element 610 may increase in size as it moves from point 1 to point 2. Then the element 610 may reduce in size at point 3 and then increase again in size at point 4. The change in size can be gradual as shown between points 1 and 2 or may be sudden such as when the object 600 disappears from the content but then reappears later.

It is contemplated that the element 610 may have the following characteristics: (i) relative center coordinates (X, Y); (ii) a width; and (iii) a height. These characteristics can vary depending on the keyframe of the content. For non-rectangular shapes, it may be necessary to provide an array of data with information about the shape of the element.

To position overlapping elements such as shown in FIG. 4, a third coordinate for each element could be used denoting the "depth" of the element, similar to the attribute HTML z-index. For example, the layer with the content has a z-index of 0. Elements can be assigned a consecutive z-index sequential of 1 and above, and elements with a z-index less than 0 should be placed under the video.

As discussed above, it is contemplated that the coordinates of the center point of the object, and optionally dimensions of the object, can be stored in a database. A center point and dimensions of a corresponding element can also be stored in a database. Where dimensions are stored, it is contemplated that the dimensions can be associated with a keyframe of the content.

In some embodiments, the system may use an XML format to store data, which describes the content and the objects inside the content. As an example, the structure of the data may be as follows:
 Video description
 Information on size of the video
 Video Statistics
 Info on object No 1
  Object Data
  Images
  Marking area
   Moving and change of scale of area
  Marking area of object
  Object Statistics
 Info on object No X Thus, in such example, a single XML file could be used to describe all the objects in the content and save all the appearances of each object throughout the content. However, this could also be done using one or more databases.

FIG. 7 illustrates an exemplary XML file format.

As one example, a user may watch a video on a streaming service using a device that has a software program installed, which embodies/enables the systems and methods described herein. While watching the video, the user can click on an element that overlays an object in the video.

For example, the user may click on or otherwise select a jacket that an actor wears in the video. This causes a small overlay to appear over the video or to a side of the video that may include a picture of that jacket, a description, reviews, a price and/or an option to purchase the jacket directly or via a third-party store.

As another example, the user may click on or otherwise select an athlete during a basketball game and instantly sees the statistics about the athlete, career highlights and any other information. The user can also choose to click on or otherwise select the athlete's sneakers to learn about them or purchase them.

As another example, the user may see a beautiful beach in a movie. The user can click on or otherwise select the beach to learn where this beach is located, read about it, view current air tickets and hotels offers from paid ad partners, and so forth.

As another example, the user may click on or otherwise select a person in the content, who may be a singer, actor, athlete, television host or other person, and obtain instant information about that person. In this manner, objects in content can be linked to any source of information (e.g., Wikipedia®, social media platforms, etc.).

As another example, the systems and methods may present an icon when music plays in the content. By clicking on or otherwise selecting the icon, the user can obtain information about the music or download/stream/purchase the music through the platform or a third-party service.

As another example, the user may watch a video of an online course. A professor in the course may suggest a further read and the user can access a link to the source or buy a physical book.

In another aspect, a user may be a video blogger who reviews gadgets. In the user's next blog, the user utilizes the plugin that permits use of the systems and methods described herein.

First, the user can create elements by marking the content using a web or other interface. The user may mark areas such as a person's face and connect the element to the person's social media accounts. Using the same interface, the user may also mark the gadget being reviewed, and the associated element can provide additional information and/or link to an online store, manufacture's website, and so forth. In this manner, viewers of the video can watch the review with an option to read about the author by clicking on the user's face, as well as buy the gadget directly from the video and the user may receive a portion of the sales.

In another aspect, a studio can create a video content (a movie for example) using the platform described herein. Prior to actual production, deals can be made with companies/brands to insert their products/services/information into the final edit of the movie. Now an audience can watch that movie on any streaming platform through their phones, tablets, televisions, or other devices.

While viewing the movie, an actor may drive a car in a scene. A viewer can click on or otherwise select the car to obtain get information about the car and may also see advertising with special offers from car dealerships, car loan companies, etc.

If a character is flying somewhere in the movie, the viewer can access special offers on tickets and hotels to that destination, for example.

If a character is wearing sunglasses, the viewer can click on or otherwise select the sunglasses to learn more about them and purchase the sunglasses if desired.

Figure 8:
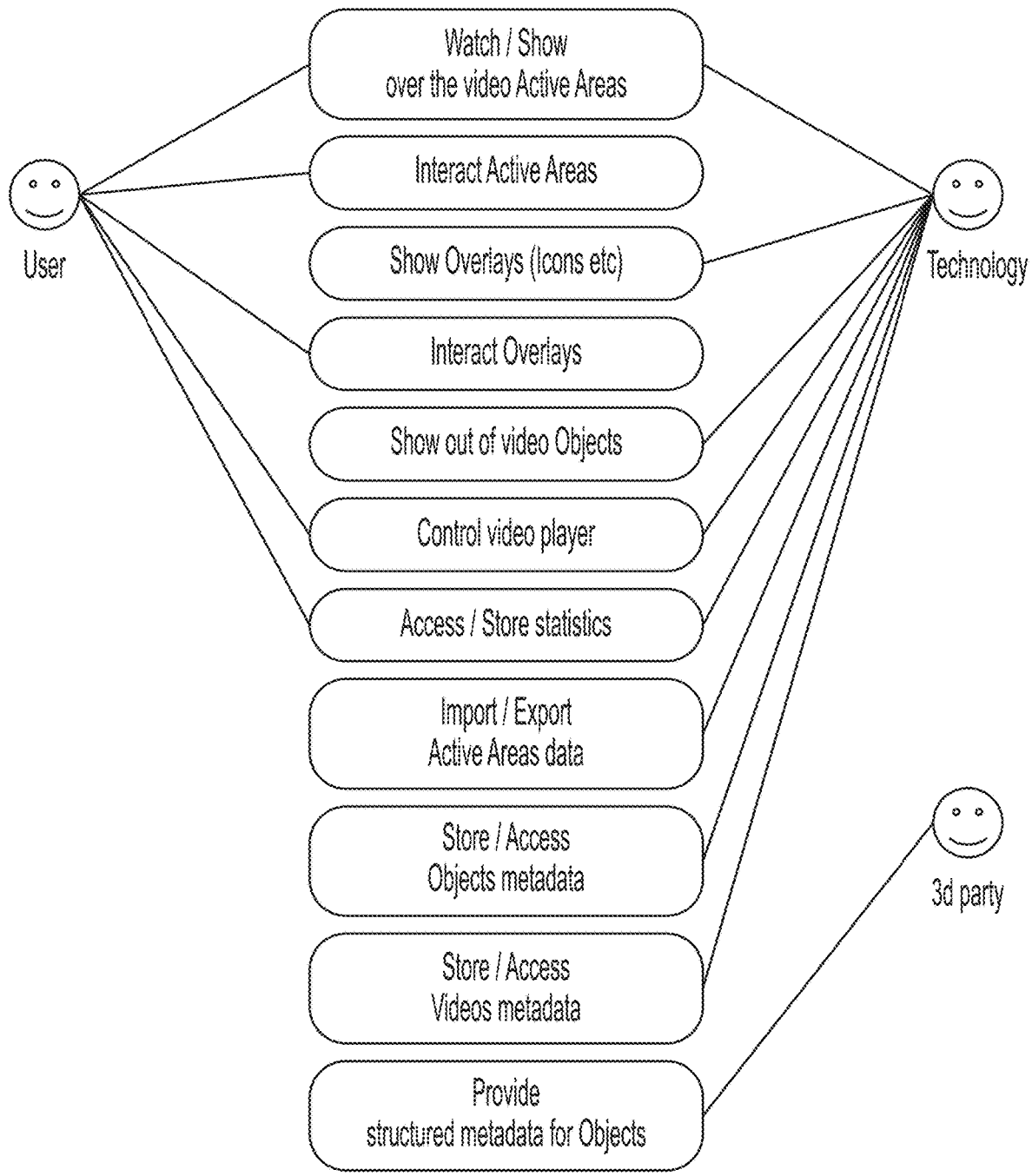
FIG. 8 illustrates an exemplary use-case diagram.

FIG. 8 provides a use-case diagram to indicate one potential of how a user, the technology (software/API) and a third party may interact with the system.

As shown, the user may watch the content having the active areas/elements and interact with one or more of the active areas/elements. The user can also control the video player (e.g., pause the video, fast forward, etc.) and may access statistics or obtain additional information about the object(s) associated with the one or more active areas/elements.

A third party may provide structured metadata for objects that can be used to generate the element information.

The technology itself as embodied in the systems and methods described herein may permit users to watch the content, provide the overlays having the active areas and elements, provide control of the video player, import/export of data concerning the active areas and elements, such as the element information, and store or access the metadata of objects and video content.

Figure 9:
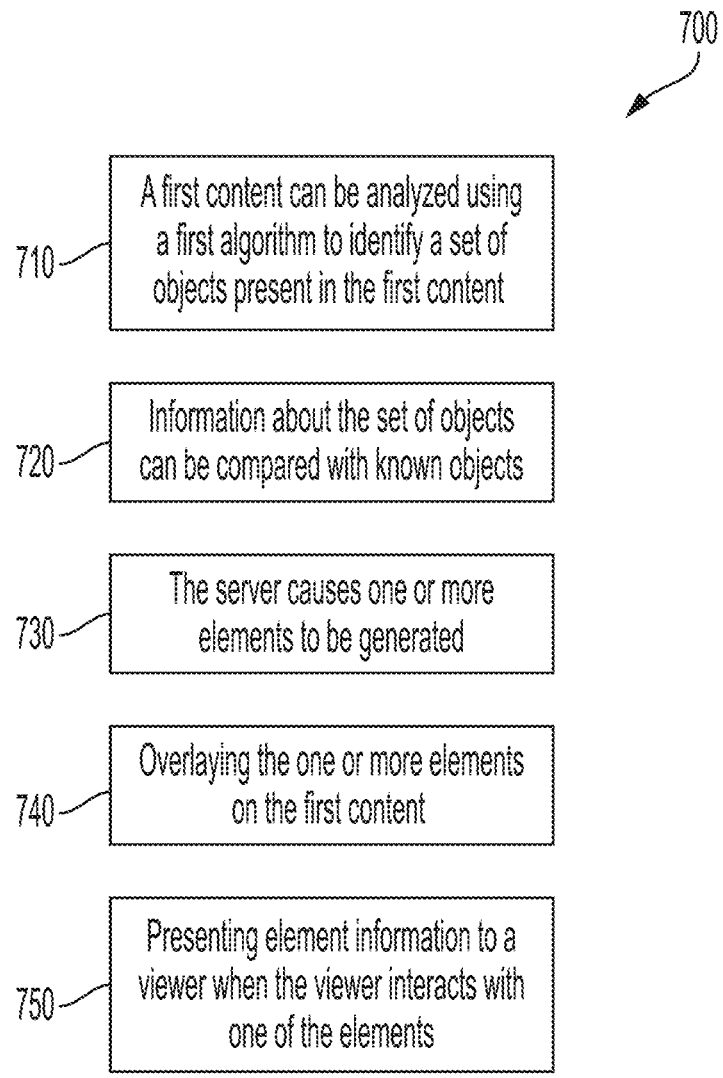
FIG. 9 illustrates an exemplary flow chart of one embodiment of a method of the inventive subject matter.

In FIG. 9, one embodiment of a computer implemented method 700 for providing layered multimedia content is shown. In step 710, a first content can be analyzed using a first algorithm or software program/API to identify a set of objects present in the first content. In step 720, information about the set of objects can be compared to a set of stored objects to determine one or more matches. Alternatively, information about the set of objects can be transmitted to a server for analysis and comparison.

In step 730, the server causes one or more elements to be generated based on the received information or comparison. Once generated, the one or more elements can be overlaid on the first content in step 740, such as by using layers as discussed above. Preferably, each of the one or more elements corresponds to one of the set of objects and comprises element information.

In step 750, the server can present the element information to a viewer when the viewer interacts with one of the elements. Such interaction could include, for example, the viewer clicking or touching an element, hovering over an element for a predetermined time period, looking at an element for a predetermined time period, using a voice command to select the element, and so forth.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer implemented method for providing layered multimedia content, comprising:
    analyzing a first content using a first algorithm to identify a set of objects present in the first content;
    transmitting information about the set of objects to a server;
    the server causing a first element and a second element to be generated based on the received information;

overlaying a first layer comprising the first element of the first content, wherein the first element corresponds to one of the set of objects and wherein the first element comprises element information;

overlaying a second layer comprising the second element on the first layer, wherein the second element corresponds to another of the set of objects and wherein the second element comprises element information; and the server presenting the element information to a viewer when the viewer interacts with one of the elements;

wherein interaction by the viewer with the second element is prioritized over interaction by the viewer with the first element when the second element overlaps the first element.

2. The method of claim 1, wherein when the viewer interacts with one of the first or second elements, the server causes a window to be overlaid on the first content that comprises the element information of that element.

3. The method of claim 1, wherein the server presents the element information to the viewer when the viewer clicks or touches one of the first or second elements.

4. The method of claim 1, wherein the server presents the element information to the viewer when the viewer hovers over one of the first or second elements for a predetermined time period.

5. The method of claim 1, wherein the server presents the element information to the viewer when the viewer looks at one of the first or second elements for a predetermined time period.

6. The method of claim 1, wherein the first content is stored on a second server.

7. The method of claim 1, wherein the first content is streamed to a first device, and wherein the server overlays at least one of the first or second elements on the first content while being streamed.

8. The method of claim 1, further comprising:
analyzing a movement of each of the objects of the set during a playback of the first content to identify a set of coordinates representing a center point of each of the objects during the playback of the first content;
transmitting the set of coordinates to the server; and
automatically updating a position of each of the first and second elements based on the set of coordinates for that element such that the position of each of the first and second elements corresponds to a movement of the corresponding object in the first content.

9. The method of claim 8, wherein information about the movement of each object is stored in a table, wherein the movement information comprises a center of the object and a keyframe of the first content, and wherein the position of each of the first and second elements is automatically updated based on the movement information.

10. The method of claim 8, further comprising:
analyzing a size and a shape of each of the objects of the set during the playback of the first content to identify the size and shape of each of the objects at each keyframe of the first content;
storing the size and shape of each of the objects for each keyframe in a table; and
automatically updating a position of each of the first and second elements based on the table such that the size and shape of each of the first and second elements changes to correspond to a change in the size or shape of the corresponding object in the first content.

11. The method of claim 1, wherein the first algorithm includes the following steps:
analyzing the first content to generate content attributes; wherein the transmitted information includes the content attributes;
comparing the content attributes with object attributes stored on the server; and
generating the first and second elements based on the comparison.

12. The method of claim 1, wherein the server is disposed in a computing device, and wherein the computing device is configured to present the first content and the first and second elements on a display screen of the computing device.

13. A non-transitory computer readable medium in which a computer program is stored, wherein the computer program includes commands which cause a processor of a server to perform a method for providing layered multimedia content, the method comprising:
receiving, via a server, a first content,
the server analyzing the first content using a first algorithm to identify a set of objects present in the first content;
automatically generating, via the server, a first element and a second element, wherein the first element corresponds to one of the objects of the set and the second element corresponds to another of the objects of the set;
the server overlaying or layering a first layer comprising the first element in front of the first content during a playback of the first content, wherein the first element comprises element information;
the server overlaying or layering a second layer comprising the second element in front of the first layer during the playback of the first content, wherein the second element comprises element information; and
the server presenting the element information to a viewer when the viewer interacts with one of the elements;
wherein interaction by the viewer with the second element is prioritized over interaction by the viewer with the first element when the second element overlaps the first element.

14. The non-transitory computer readable medium of claim 13, wherein the method further comprises:
the server causing a window to be overlaid on the first content when the viewer interacts with one of the first or second elements, wherein the window comprises the element information of that element.

15. The non-transitory computer readable medium of claim 13, wherein the method further comprises:
the server presenting the element information to the viewer when the viewer clicks on one of the first or second elements.

16. The non-transitory computer readable medium of claim 13, wherein the method further comprises:
the server presenting the element information to the viewer when the viewer hovers over one of the first or second elements for a predetermined period.

17. The non-transitory computer readable medium of claim 13, wherein the method further comprises:
the server analyzing a movement of each of the objects of the set during a playback of the first content to identify a coordinate of a center of each object at a keyframe of the first content;
the server storing the coordinate and the keyframe in table;
the server automatically updating a position of each of the first and second elements based on the stored coordinates and keyframes for that element such that the position of each of the first and second elements corresponds to a movement of the corresponding object in the first content.

18. The non-transitory computer readable medium of claim 13, wherein the method further comprises:
analyzing the first content to generate content attributes;
wherein the transmitted information includes the content attributes;
comparing the content attributes with object attributes stored on the server; and
generating the first and second elements based on the comparison.

19. A system for providing layered multimedia content, comprising:
a server comprising a processor and a memory communicatively coupled with the processor, wherein the memory stores a first program;
the server configured to analyze a first content using the first program to identify a first object present in the first content and a second object present in the first content;
the server further configured to automatically generate a first element and a second element, wherein the first element corresponds to the first object and the second element corresponds to the second object;
the server configured to overlay, or append a first layer comprising, the first element in front of the first object during a playback of the first content, wherein the first element comprises element information;
the server configured to overlay, or append a second layer corresponding, the second element in front of the first layer and the second object during a playback of the first content, wherein the second element comprises element information; and
the server presenting the element information to a viewer when the viewer interacts with the first element or the second element;
wherein interaction by the viewer with the second element is prioritized over interaction by the viewer with the first element when the second element overlaps the first element.

20. The system of claim 19, further comprising:
the server further configured to analyze the first content to generate content attributes and compare the content attributes with stored attributes in the memory; and
generating, by the server, the first element based on the comparison.

21. The system of claim 19, further comprising:
the server further configured to analyze a movement of the first object during the playback of the first content to identify a coordinate of a center of the first object at each keyframe of the first content;
the server storing the coordinate and the keyframe in a table;
the server automatically updating a position of the first element based on the stored coordinates and keyframes such that the position of the first element corresponds to the movement of the first object in the first content.

* * * * *